July 23, 1968   M. S. FIRNHABER   3,393,986
APPARATUS FOR MANUFACTURING MINERAL FIBERS
Filed May 28, 1965
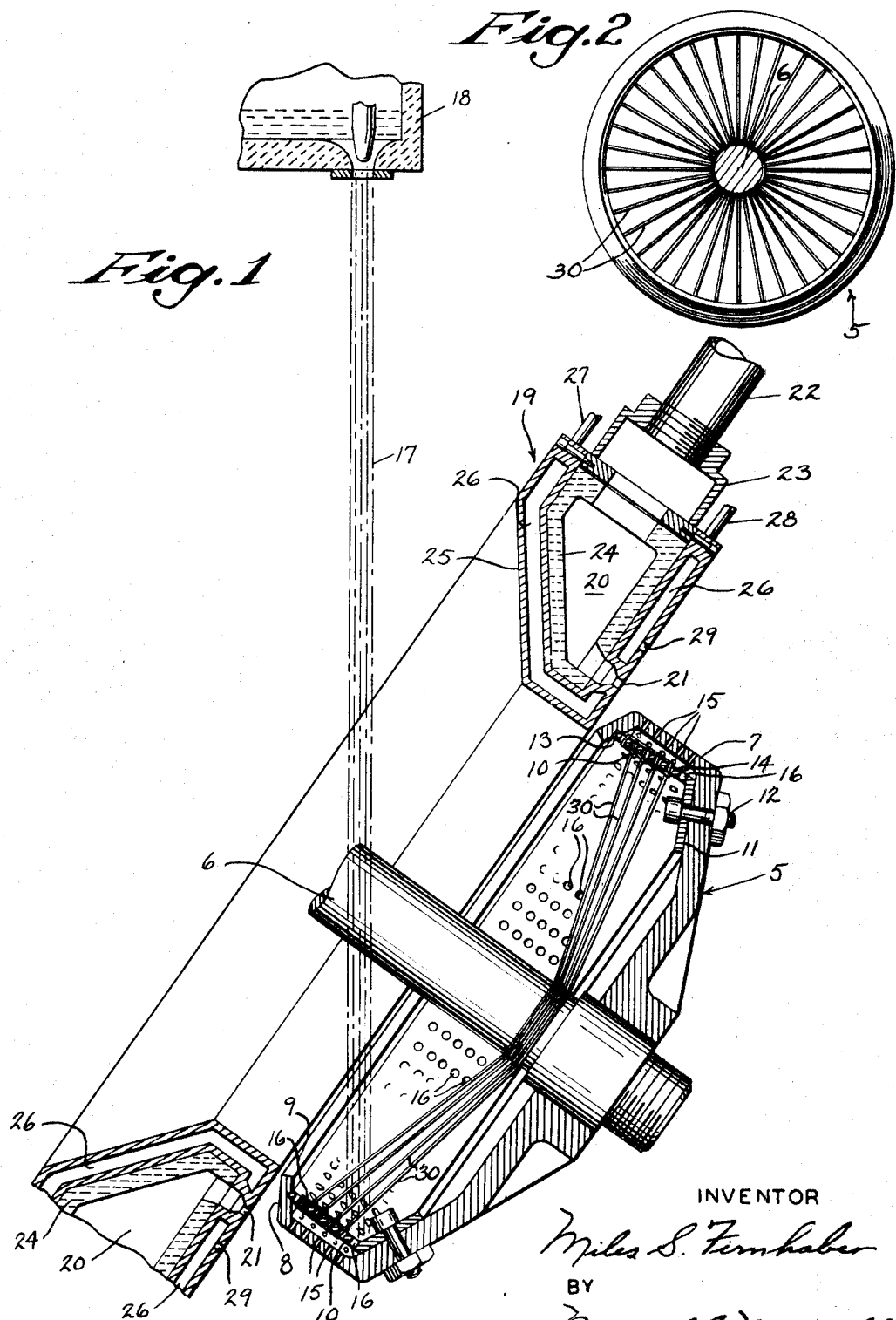

United States Patent Office 3,393,986
Patented July 23, 1968

3,393,986
APPARATUS FOR MANUFACTURING
MINERAL FIBERS
Miles S. Firnhaber, Rte. 3, Pewaukee, Wis. 53072
Filed May 28, 1965, Ser. No. 459,820
5 Claims. (Cl. 65—15)

ABSTRACT OF THE DISCLOSURE

In apparatus for manufacturing mineral fibers, a cup-shaped rotor with a top opening to receive a stream of molten material, the rotor having inner and outer rims each with a multiplicity of small apertures, there being an annular chamber between said inner and outer rims, and spaced, radially-extending wires carried by the rotor within the inner rim in a position to act on the stream of molten material to preliminarily break up such stream.

---

This invention relates to improvements in apparatus for manufacturing mineral fibers such as glass wool.

When molten glass is centrifuged directly through a multiplicity of holes in the rim of a rotor the holes must have a certain minimum diameter to enable the molten glass to pass through. Such passage, however, is necessarily retarded and a pool of molten glass tends to form adjacent the lower portion of the periphery of the rotor. This may cause premature cooling, with the result that the discharged material may be in the form of thin rods which are prematurely cool. When this occurs many of the thin rods fail to fiberize when subjected to the fiberizing blast, and there will be an undesirable percentage of slugs or coarse fibers. In addition to the above, if a pool of molten glass tends to build up in the rotor it will usually unbalance the latter, with undesirable results.

It is a general object of the present invention to overcome the above problems by providing an improved apparatus for manufacturing glass fibers wherein a novel construction is employed in the rotor in which the stream of molten glass is preliminarily broken up within the rotor before it is discharged from the periphery.

A further object of the invention is to provide apparatus for manufacturing glass fibers wherein the rotor may have a plurality of spaced radially extending wires which rotate with the rotor and break up the stream of molten glass which is being delivered into the rotor. Thus the molten glass is broken up into many small streams which are more easily centrifuged from the rotor.

A further object of the invention is to provide apparatus in which there may be inner and outer apertured rims to provide a multi-stage centrifuging arrangement, the outer rim having holes of one size, and the inner rim having holes of less diameter. Such inner rim may be used with or without the wires and the wires may be used with or without the inner rim. Where the inner rim is employed it serves to preliminarily break up the stream of molten glass. If the wires are used together with the inner apertured rim, a highly efficient arrangement is provided in which the molten glass is preliminarily broken up in two stages—first by the radial wires, and then by passage through the apertures of the inner rim. With any of the above arrangements, more molten glass is centrifuged by the rotor in a given period of time, and a finer product, with less slugs and coarse fibers is produced. Also, in the improved construction the preliminary breaking up of the stream of molten glass allows the molten glass to be quickly and uniformly centrifuged and provides for relatively even distribution of the glass material adjacent the outer rim, the preliminarily broken up material then being centrifuged through the holes in the outer rim portion.

While my prior Patent No. 3,054,140 discloses large holes in an outer rim which are covered by relatively fine screening, in this prior construction the holes in the outer rim are so large that the outer rim merely serves the purpose of backing up the screening. In said prior patent, there is no preliminary breaking up of the molten stream before centrifuging.

A further object of the present invention is to provide apparatus as above described which produces a finely fiberized product with a minimum of slugs and coarse fibers.

A further object of the invention is to provide a construction as above described having radial wires with or without the inner apertured rim portion wherein the preliminary breaking up of the molten glass serves to reduce the wear on the openings in the outer rim of the rotor proper.

A further object of the invention is to provide improved apparatus for the manufacture of glass fibers wherein the burner is surrounded by a cooling jacket containing steam which is adapted to be superheated by the burner. This steam cools the refractory material of the burner and is continuously discharged around the rotor to serve as a means for rapidly conveying the processed fibers away from the rotor, thus increasing production. Thus the steam in the jacket serves the dual purpose of cooling and conveying.

With the above and other objects in view, the invention consists of the improved apparatus for manufacturing glass fibers, and all of its parts and combinations, as set forth in the claims, and all equivalents thereof.

In the accompanying drawing, illustrating one complete embodiment of the preferred form of the invention, in which the same reference numerals designate the same parts in all of the views:

FIG. 1 is a transverse sectional view through a rotor and burner, and through a fragment of a forehearth, parts being broken away; and FIG. 2 is a plan view of the rotor alone.

Referring more particularly to the drawing, the apparatus includes a cup-shaped rotor 5, of suitable heat resistant material such as a chrome-nickel alloy, mounted on the lower end of a drive shaft 6. The shaft is rotatably driven by any suitable means and is suitably supported to drive the rotor 5 at high speed. The rotor has an outer rim 7 provided wth an inturned annular lip 8 surrounding an opening 9. Detachably mounted within the rotor in inwardly spaced relationship from the outer rim 7 is an inner or auxiliary rim 10 having an annular mounting flange 11 which is detachably secured by nuts and bolts 12 to the lower portion of the rotor. The outer edge of the inner rim 10 is detachably received in a groove 13 of the annular rotor flange 8. The arrangement is such that there is an annular chamber 14 between the inner rim 10 and the outer rim 7, which chamber is closed on the bottom by the rotor and on the top by the rotor flange 8.

The rim of the rotor, or outer rim 7, is provided throughout its periphery with a multiplicity of relatively small holes 15. These are preferably between $\frac{1}{32}''$ and $\frac{1}{8}''$ in diameter. The inner or auxiliary rim 10 is provided with a multiplicity of holes 16 which are of larger size, usually between $\frac{1}{8}''$ and $\frac{1}{4}''$ in diameter. The inner rim is formed of suitable heat resistant metal such as a chrome-nickel alloy.

While the rotor shaft may be disposed at various angles, it is a feature of the present invention that it be mounted at an oblique angle so that a stream 17 of molten glass from a forehearth 18, which is suitably supported above the rotor, will be directed toward the inner rim 10 on a lower portion of the rotor substantially as shown.

In the prefered embodiment of the invention illustrated there are a plurality of radially extending wires 30 extending from the rotor shaft 6 to the periphery. These wires are preferably formed of nickel-chrome alloy and have their inner ends suitably secured to the shaft 6 and their outer ends suitably secured to the periphery. Where an inner rim such as the inner rim 10 is employed, the outer ends of the wires may be suitably secured through the use of some of the holes 16, there being many more holes than it is practical to illustrate. If the inner rim 10 is omitted, the end of the wires may be suitably secured to the outer rim by use of some of the holes 15 in said outer rim. It is preferred to employ the wires in multiple planes such as the four planes illustrated in FIG. 1. For example, there may be nine wires to a plane, which are so positioned with respect to the wires in other planes that there is a wire every ten degrees, as shown in FIG. 2. These wires serve to preliminarily break up the stream 17 of molten glass which is pouring into the rotor into many small streams. Where the inner rim 10 is employed, there is a second stage breaking up by passage through the holes 16 of the inner rim. However, if the inner rim is not employed, the wires 30 will preliminarily break up the stream 17 before the molten glass is centrifuged through the holes 15 of the outer rim. This preliminary breaking up can also be performed by the relatively larger holes 16 of the inner rim whether or not the wires 30 are employed. Use of the wires, however, together with the inner rim greatly increases the efficiency and provides for an improved product.

A suitably supported burner 19 is arranged as illustrated to discharge a fiberizing blast of hot gases from the annular burner chamber 20 through a circular slot 21, the slot being positioned so that the gases act upon material thrown by centrifugal force from the rotor, as is well known in the art.

The burner has one or more inlet pipes 22 which supply gases to a manifold 23. The annular burner chamber is surrounded by refractory material 24 which is cooled by a cooling jacket 25 having a steam space 26, into and out of which steam may be circulated by the pipes 27 and 28. The steam is superheated by the burner and, at the same time, tends to act as a cooling agent around the refractory material 24. In addition, this superheated steam is discharged as at 29 from a circular slot, or from a circular series of small openings, which are so arranged around the rotor as to rapidly convey away the fiberized material.

Operation

In operation, the molten glass from the stream 17 is first intercepted and preliminarily broken up by the wires 30 which are rotating with the rotor. The glass thus broken up is then received by the lower portion of the rapidly rotating rotor, as illustrated. Due to the action of centrifugal force, it is rapidly distributed around the periphery of the inner rim 10 and caused to pass through the first stage or coarser holes 16 into the annular chamber 14. Due to the larger size of the holes 16 as compared with holes which are used in an outer rim in conventional rotors, the molten material is rapidly transfered to the annular chamber 14 in a preliminarily broken-up condition to enable it to more readily be centrifuged through the smaller holes 15 in the outer rim. Due to this fast action the tendency to collect a pool of molten glass in the rotor is minimized, with the result that the molten glass is not prematurely cooled in the rotor. Thus the molten glass that passes through the outer holes 15 is sufficiently hot that there is a minimum of slugs and coarse fibers when it is acted upon by the fiberizing blast from the burner 21. In addition, the present construction produces a finer fiber due to the fact that smaller holes may be successfully employed at 15. The fine fibers are then conveyed away by the annular steam blast from the annular slot or annular series of holes 29.

Due to the use of the preliminary breaking up of the molten glass it passes through to the annular chamber 14 very quickly and, due to the annular shape of the chamber 14, is distributed evenly in said annular chamber so that the usual problem of a pool building up in the lower portion of a rotor to unbalance the same is eliminated. In addition to the above, the use of either the wires 30 or the relatively coarse holes at 16, or both, to preliminarily break up the molten glass reduces wear on the holes 15 in the outer rim 7 of the rotor proper. Thus the rotor proper may be used for a relatively long time. When the inner apertured rim 10 becomes unduly worn it can be readily replaced by removing the nuts and bolts 12.

By utilizing the cooling steam from the jacket space 26 for the dual purpose of cooling and conveying, an efficient conveying medium is provided which is capable of rapidly moving the fibers away from the rotor, to thereby permit an increase in production.

Various changes and modifications may be made without departing from the spirit of the invention, and all of such changes are contemplated as may come within the scope of the claims.

What I claim is:

1. In an apparatus for manufacturing mineral fibers, a rotatably supported cup-shaped rotor having a surrounding outer rim with a multiplicity of small apertures, and having a top opening for receiving a stream of molten material, and a plurality of spaced wires supported by the rotor and extending transversely of the top opening in a position to act on the stream of molten material entering said opening to preliminarily break up the material before it is centrifuged through the apertures in said rim.

2. Apparatus for manufacturing mineral fibers as set forth in claim 1 in which said wires are radially extending.

3. Apparatus for manufacturing mineral fibers as claimed in claim 1 in which the rotor is supported on a central shaft and in which the wires are supported to extend radially from said central shaft to a position adjacent the periphery of the rotor.

4. In an apparatus for manufacturing mineral fibers, a rotatably supported cup-shaped rotor having a top opening to receive a stream of molten material and having a surrounding outer rim with a multiplicity of small apertures and an auxiliary rim also having a multiplicity of small apertures supported within said outer rim in a position to provide an annular chamber between said auxiliary and outer rims whereby molten material fed into said rotor will be centrifuged in two stages, preliminarily through the apertures of the auxiliary rim into said annular chamber and then from said annular chamber through the apertures of the outer rim, and spaced wires carried by the rotor and extending transversely thereof in a position to act on the stream of molten material fed to the rotor to preliminarily break up said stream.

5. Apparatus for manufacturing mineral fibers as claimed in claim 4 in which the wires are radially extending.

References Cited

UNITED STATES PATENTS

| 3,190,736 | 6/1965 | Benner | 65—15 |
| 3,238,028 | 3/1966 | Simmers | 65—6 |
| 3,295,943 | 1/1967 | Mabru | 65—6 |
| 3,316,074 | 4/1967 | Laurent et al. | 65—8 |

DONALL H. SYLVESTER, *Primary Examiner.*

R. L. LINDSAY, *Assistant Examiner.*